May 3, 1960 T. E. ABEEL ET AL 2,935,669
ENCAPSULATED MICA CAPACITOR
Filed Oct. 14, 1954 2 Sheets-Sheet 1
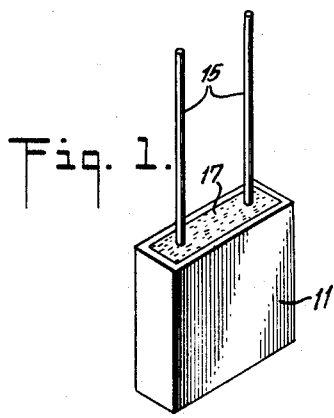
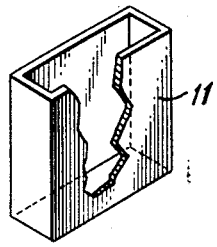
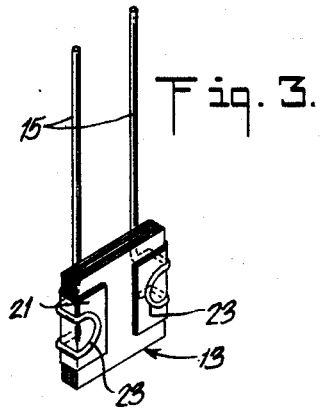
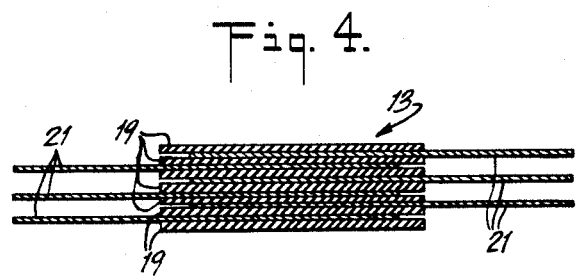
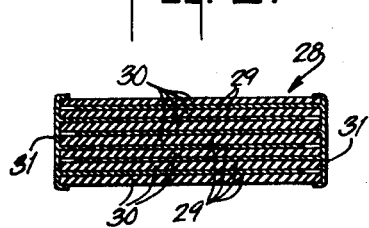
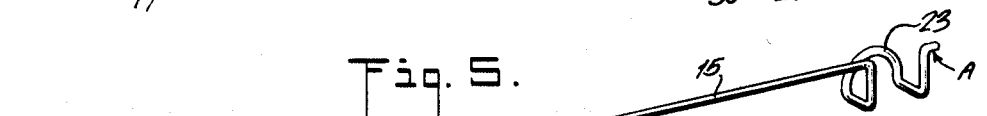
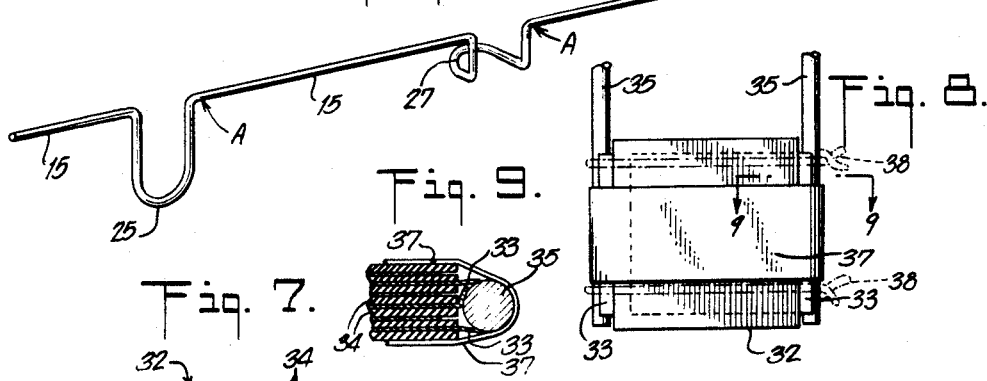
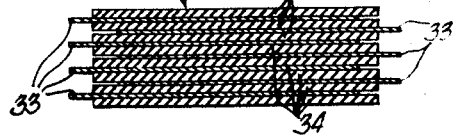
INVENTORS
THEODORE E. ABEEL
JACK GREENBERG
BY JAMES McHUGH
W. D. Keith,
ATTORNEY

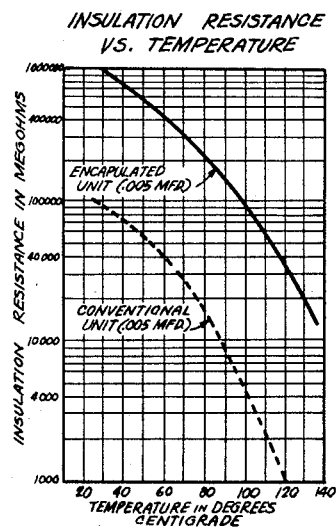
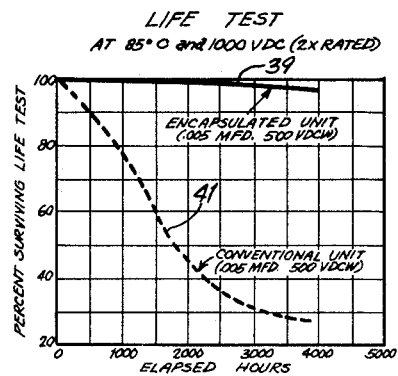
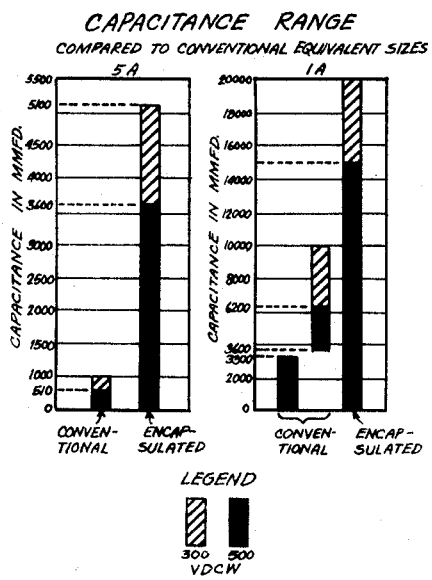
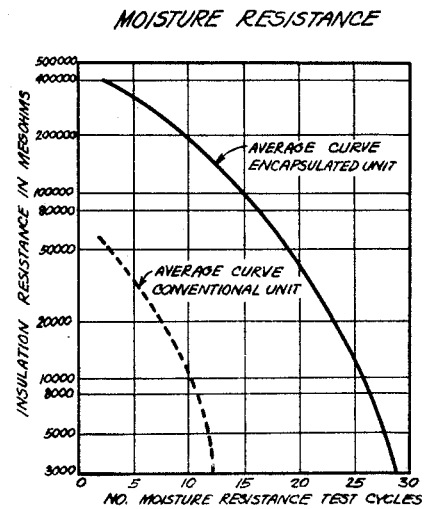

United States Patent Office 2,935,669
Patented May 3, 1960

2,935,669

ENCAPSULATED MICA CAPACITOR

Theodore E. Abeel, Barrington, and Jack Greenberg, Providence, R.I., and James McHugh, Marion, Mass., assignors to Cornell-Dubilier Electric Corporation, South Plainfield, N.J., a corporation of Delaware Application October 14, 1954, Serial No. 462,299

5 Claims. (Cl. 317—261)

This invention relates to electrical capacitors of that type in which mica or mica-like material all herein termed "mica" is employed as the dielectric material. The invention is also concerned with a method or methods of assembling such capacitors. Specifically, the invention deals with certain features of capacitor construction which have particular advantage and usefulness in the assembly and the assembled construction of relatively small capacitors.

Heretofore, the ordinary procedure employed in manufacturing small mica capacitors has involved a number of drawbacks or difficulties. Such capacitors are comprised of a capacitor section formed of interleaved sheets of mica and conductive material, such as foil. Leads are attached by clamps to the section which is then molded to form a case enclosing the section. Among the difficulties encountered have been those produced by the steps employed in the manufacture which have produced, or which have been the cause of, a comparatively high percentage of rejects in the finished product. In addition and even more important, latent defects have been set up that caused changed characteristics and even failures soon after the capacitors are put into use. One of the major causes for such difficulties has been the comparatively high pressures employed in at least two of the operations used during the manufacture.

A capacitor section is made up of a predetermined number of alternate layers of thin mica sheets and sheets of metal foil or the like, which make up the plates of the capacitor that are separated by the mica acting as dielectric material. Among the various pressures applied at times during the construction and assembly of the unit there are those that subject the unit and the mica sheets to destructive strains which may be of a minute nature and undetectable when the condenser is first made or tested but which later develop when the condenser is placed in service and operation. The mechanical stresses applied to the mica sheets create microscopic defects such as opening the cleavages, and experience has demonstrated that such capacitors might pass all desired tests and operate satisfactorily for some time but that the unit deteriorates with the length of operation and we have found that such deterioration is partly due to these minor defects. Because of these defects there will develop, especially when used with high frequency, losses which may be due to microscopic ionic discharges. These discharges gradually increase the losses of the unit which in turn increase the ionic discharges so that a vicious cycle is started. The defect causing more losses and the losses causing greater losses in time and the greater losses causing more defects ultimately ending in either a breakdown or a total rejection.

One of the pressure sources of damage to the capacitor sections as molded, has been the extreme pressures that must necessarily be employed during the step of molding the section into the desired phenolic resin casing. The most common example of such a resin is called "Bakelite." Throughout this description including the claims, the term "Bakelite" is used in its generic sense to refer to any of a number of phenolic resins having desired thermosetting, hard, heat resisting properties.

Such molding has been accomplished by using two pellets of the "Bakelite" material, one the top and one the bottom of the capacitor section and then subjecting the whole stack to high pressure and heat in a hydraulic press. The operation of the press often damaged the capacitor section because the pressure exerted in the molding of "Bakelite" around a section, frequently set up stresses in the mica sheets such that the mica would be cracked or even broken, and for this reason a change in the characteristics of the condenser would rapidly develop with use and eventually cause a complete breakdown. The fractures in the mica, from the pressure, may not show up on the initial electrical test given each condenser following its assembly and changes in characteristics and breakdown come after the condenser has been put in use, and therefore the defect is of a more serious nature than if it could be detected upon inspection at the completion of the assembly. Thus, as indicated above, there will be a vicious cycle set up by the latent defects which will cause a cumulative effect that rapidly brings on a breakdown after the condenser is in use.

To illustrate further the drawbacks and difficulties of the prior molded type of capacitor, it is pointed out that the process of making such molded capacitors involved the use of large, heavy, expensive steel dies made to very accurate dimensions. As indicated above, a capacitor section to be molded was placed in the die when open, with a pellet of "Bakelite" material on each side thereof. Then the die or dies were heated sufficiently to melt the "Bakelite" pellets while at the same time the die was closed under pressure, resulting in a product of a given thickness. Now it is to be noted that the internal pressure to which the capacitor is subjected will vary from one capacitor to the next for at least two reasons. First, the size or capacity of the capacitor being molded may be varied for a given die. Second, the thickness of the layers of a capacitor section will vary from one section to the next for a given capacitance. Consequently the characteristics of the final capacitors produced will tend to vary to such an extent that the number of rejects becomes quite considerable. Furthermore, where a thin capacitor section was employed, there was insufficient "Bakelite" material and the space in the die was not filled so that the finished product was porous.

Another difficulty has been damage to the leads caused by the hydraulic press used in molding the section into its casing. The leads often have been damaged so that they would break upon bending and therefore must be rejected. Also the leads sometimes have been sheared off completely.

An additional difficulty has been that in the molding operations, it has been practically impossible to obtain a moisture proof seal around the leads. Even though the capacitor section is coated with wax prior to the molding in "bakelite," the heat involved in the molding causes the wax to melt and run so that adhesion of the molding material to the wire leads and to the capacitor section itself, is prevented. Therefore, it has been necessary to coat the capacitors with wax after the molding step to seal the leads. However, in soldering the leads during installation of the capacitors the wax may be melted to an extent that the moisture seal is not reliable. The wax is also subject to melting when in installations that operate at elevated temperatures.

Furthermore, with the molded type of capacitor it has been necessary to provide walls on both sides of the section of relatively great thickness, because during the pressing operation if one of the "bakelite" pellets is heated more rapidly than the others; or for other reasons the section is pushed closer to the outer surface on one side, the wall will lack the necessary strength, unless provision is made for greater wall thickness than would be needed if the section were exactly centered. Otherwise, very costly equipment and/or manual operation would be required to provide the exact centering of the capacitor section.

Such difficulties are avoided by use of this invention because no undue pressures are employed, and effective moisture sealing is effected without relying on a wax, or other seal which is subject to melting at elevated temperatures.

Other difficulties which were present in the prior type of capacitor have been overcome or eliminated as will appear from the description of the invention.

It is an important object of this invention to provide a capacitor and means of manufacturing the same in which the capacitor is not subject to undue pressures, so that there results a finished product substantially free from patent or latent defects.

Another object of this invention is to provide a capacitor having a casing and a moisture proof seal around the leads from such condenser.

Another object of this invention is to provide a mica capacitor having a premoldled exterior casing and employing a method of placing the section in the premolded casing so as to ensure that the section will be protected by a casing of sufficient thickness to provide the necessary strength and insulating properties, but at the same time having relatively thin walls. The strength of these premolded thin walled casings is greater than walls of the same or greater thickness of the prior molded type of capacitor, because both inside and outside surfaces of the premolded casing, are formed against the hard steel, heated surfaces of the molding die. Consequently, a proper setting of the "bakelite" is obtained, and the premolded casing is much less porous and hydroscopic, and thereby substantially increases the life of the capacitor unit.

Another object is the prevention of damage to the leads of the capacitor and also the prevention of physical damage to the mica layers of the capacitor section.

A further object of this invention is the provision of a moisture proof casing for the capacitor section.

A still further object is the provision of a large contact area between the leads and the conductive material layers of a capacitor section.

Another object of this invention is to provide greatly simplified clamps for making contact between the leads of the capacitor and the conducting material foils of a given section. Such simplified clamps being integral with the leads themselves so that the leads are merely an extension from the desired configuration of the clamps as formed from a continuous supply of lead wire material.

A further object of the invention is to provide a capacitor of reduced outside dimensions without reducing the capacitance value and limiting the other electrical characteristics. This object is of importance because of the recent trend toward miniaturization of electronic equipment.

These and other objects of the invention will appear from the description of an embodiment of the invention.

Briefly, this invention is concerned with an improved method of manufacturing mica capacitors encased in "bakelite" which comprises the steps of bonding a capacitor section of predetermined electrical characteristics, applying preformed clamps made from a continuous piece of lead wire, while maintaining the forces applied to the section below a damaging magnitude. Inserting the section and lead wires, with the clamps in place, into an open-ended premolded casing, and filling the casing around the section and leads with an epoxy or other suitable resin.

This invention is also concerned with an improved relatively small mica capacitor that comprises a capacitor section having alternate layers of mica and conducting material, said conducting material layers alternately extending beyond the mica on each of two sides in order to form electrodes. A bonding material for holding the layers of said section together, and terminal elements formed integrally from lead wires for making electrical contact with the electrodes. The said terminal elements being held in mechanical contact with the electrodes in order to make electrical contact with the conducting material of the electrodes. A premolded "bakelite" casing having an opening for receiving the capacitor section with leads attached thereto, and an epoxy or other suitable resin filling the space within the said casing around the capacitor section with its terminal elements, to form a superior moisture proof capacitor encased in "bakelite" that has accurate and stable capacitance characteristics and long life.

An embodiment of this invention is set forth below, and illustrated by the accompanying drawings in which—

Fig. 1 is a perspective view of a completed capacitor having its two leads extending from the same side of the capacitor;

Fig. 2 is a perspective view of a pre-molded casing for use in forming the final product;

Fig. 3 is a perspective view of a capacitor section being sealed into its outer casing but after the section has been assembled, with bonding, and its terminal clamps applied;

Fig. 4 is an enlarged sectional end view of the capacitor section of mica and conducting material elements as interleaved prior to the bonding and forming of the section;

Fig. 5 is a perspective view of a section of wire showing three separate stages in the formation of a lead and clamp as used in connecting the leads to the capacitor section;

Fig. 6 is an enlarged end view in cross section of a capacitor section where the conducting material is coated on one face of the mica sheets and no foil is used;

Fig. 7 is an enlarged end view of a stack of mica and foil for forming a capacitor section according to another embodiment as contemplated by this invention;

Fig. 8 is an enlarged plan view of a capacitor section according to the same embodiment as Fig. 7;

Fig. 9 is a fragmentary cross-section view taken along the line 9—9 of Fig. 8; and Figs. 10–13 are graphs showing comparisons of a capacitor according to this invention and a prior molded capacitor of comparable type.

Like reference numbers refer to like parts throughout the drawings.

It is to be noted that among the difficulties heretofore encountered in the manufacture of mica capacitors molded in "bakelite" or like material casings, has been the difficulty in obtaining a moisture proof seal for the capacitor as finally produced. One of the reasons for this difficulty is the fact that "bakelite" and similar molding resins do not satisfactorily adhere to the metal leads and for this reason where the leads emerged from the molded casing it has been difficult to prevent moisture from entering. As noted above, this difficulty was not satisfactorily remedied by coating the finished capacitor with wax, because the wax would become sticky, and when the metal leads were subjected to too high temperatures such as for soldering short leads or when the capacitor was installed in an apparatus that operated at elevated temperature, the wax would be melted out and leave space around the leads where moisture could penetrate. Furthermore, should the capacitor section first be coated with wax before the molding step, the elevated temperatures encountered in molding would cause the wax to melt and run forming a coating that itself prevents intimate contact between the "bakelite" and the capacitor section including its leads. This coating was then subject to the same melting out as mentioned above. Another cause of moisture penetration was an incomplete setting of the phenolic resin sometimes combined with a removal of the molded capacitor from the mold forcibly by the leads. Or even such forcible removal alone was enough to enlarge the openings around the leads.

Some of the features employed in the present construction of capacitors are or were known and have been used in the past. However, in spite of such known structures and techniques, the above mentioned difficulties and drawbacks in the manufacture of mica capacitors had not heretofore been overcome, and consequently it is by means of the steps and combination as set forth herein embodying the features of this invention, that these difficulties have been overcome with great success.

Fig. 1 illustrates a finished capacitor that has an exterior preformed casing 11 which may be constructed of any hard plastic material, e.g. "bakelite" or similar phenolic resins such as "Plaskon," "Durez" or "Durite." The casing 11 is rectangular in shape and has a hollow interior with an opening at one end as may be clearly observed by reference to Fig. 2, in which a section of the case is broken away to show the interior. The finished capacitor as illustrated in Fig. 1 comprises a capacitor section 13 (Fig. 3) with its lead wires 15 clamped into position thereon. The whole section 13 being placed in the casing 11 and sealed therein with a moisture proof material 17 such as an epoxy resin, e.g. "Hysol," "Randac" or "Araldite."

As may be observed in Fig. 4, the capacitor section 13 is made up of alternate layers of mica 19 and conducting material such as metal foil sheets 21. The mica layers may in some cases also have a silvered or other metalized coating on one face or both sides of each layer. Before making up such a section, the mica layers are accurately gaged for thickness and then individually given a voltage test so that any defective sheets or layers may be rejected before they are incorporated in a capacitor section. Following this the mica layers may be metalized or not as indicated above, and then stacked alternately with sheets of metal foil. When the required number of layers have been built up to produce a predetermined electrical capacity with the voltage characteristics determined by the thickness of the mica layers, the stack or section 13 is bonded together by using predetermined pressure and heat after being given a coating of varnish. Such varnish preferably will contain acrylic resin or material which is at least partially polymerized during the application of heat and pressure. Prior to the application of heat and pressure to the stack there is another step consisting of bending or wrapping over the foil ends 21 that extend beyond the stack of mica. Consequently, a compact unit or section 13 is formed which has an appearance such as that clearly illustrated in Fig. 3, excluding the lead wires 15 and the clamps 23. This capacitor section 13 will be subjected to a predetermined pressure in the course of the assembly while at the same time an acrylic resin or other coating and bonding material will be applied, so that the electrical capacity of the section 13 may be determined to a fine degree of accuracy. The section is heated concomitantly with the application of pressure, sufficiently to cause at least a partial polymerization or setting of the coating material, to thereby solidify and hold together as a unit the condenser section 13. In this manner the electrical characteristics of the condenser section 13 may be predetermined to a very accurate degree within close tolerance limits.

By employing the subsequent steps as set forth herein, no forces that would upset the good characteristics obtained thus far, will be introduced while completing the encasing of the unit for permanent use and/or for commercial handling.

It will be observed that the lead wires 15 make contact with the electrodes of the capacitor section 13 by means of clamps 23 (Fig. 3 and Fig. 5). The clamps 23 may be sprung open sufficiently to insert each clamp over one side of the capacitor section 13, allowing the spring action of the preformed clamp to apply sufficient mechanical pressure for obtaining a good electrical contact without causing any undue pressures that might mechanically injure the mica layers or the foil ends. The clamp 23 may thereafter be soldered to the foil of the electrodes 21 if desired. It will be noted that although the two leads 15 and their clamps 23 have been so arranged that the lead wires both extend from one side of the capacitor section 13, it would be a simple matter to reverse the position of one of the clamps 23 in order to have its lead wire 15 extend in the other direction should it be desirable to have one lead wire extending one way and the other extending the opposite way from capacitor section 13. Similarly, one lead wire 15 and clamp 23 could be placed in position over one end of the capacitor section 13 so that the two leads 15 extend at right angles to one another, should this be desired.

Fig. 5 illustrates three steps employed to form the clamps 23, and it will be obvious that these clamps 23 have a simple configuration which lends itself to be machine-formed in sequential steps from a continuous supply of wires, in an inexpensive manner. For example, a section of wire 15, e.g. of the type ordinarily used for capacitor leads, as illustrated in Fig. 5 may be first bent into a U-shaped loop 25 and then with another operation, or even at the same time, may be further shaped by bending the U-shaped loop 25 at about the middle of its straight legs, at right angles to the plane of the U-shaped loop 25. Thus a bend 27 is formed having the configuration illustrated in Fig. 5. Finally the bend 27 will be formed into a clamp 23, by bending the looped end portion of the bend 27, into a plane substantially parallel to the plane of the original U-shaped loop 25, as illustrated in Fig. 5. It will be noted that the lead wire 15 may be severed close to the clamp 23 at the location indicated by the arrows A. Such severance may be accomplished at the same time as the clamp 23 is applied to the capacitor section 13, if desired.

The steps of forming the clamps 23 and the leads 15 and severing them from the continuous supply of wire may be carried out by hand tools or by any suitable wire forming and cutting apparatus. This invention contemplates such various well-known means for performing such steps. The significance of the method of this invention is the integration of the leads and the clamps and the method of producing them step by step from a continuous supply of wire. Furthermore, the formation of the lead and application of the clamps to the capacitor sections of the invention either by formation of the clamp directly on the capacitor section or by snapping the clamp into position on the section after the clamp has been formed, as described above, is carried out without any excessive pressure being exerted on the capacitor section. Therefore, the formation of the clamp and its application to the section contributes to the making of the capacitor of this invention in which the capacitance value of the capacitor when once established is not disturbed during the attachment of the leads and the encasing of the section.

In Fig. 6 there is illustrated an alternative embodiment, i.e., where a capacitor section 28 is built up using mica sheets 30, but not employing any foil. There being merely silvered or other conducting metalized surfaces 29 which are joined together electrically to make electrodes 31. These electrodes 31 may be constructed by metalizing the edges of the capacitor section 28, or otherwise effecting a joining into common circuits the alternate layers of conducting material. The capacitor section 28 as thus constructed may then have the lead wires 15, incorporating clamps 23, placed into position for making contact with the electrodes 31 in a manner similar to that described above and illustrated in Fig. 3. As before, the leads 15 may be soldered to the electrodes 31 after they are in place on the capacitor section 28.

Another embodiment of a capacitor section including lead wires attached thereto is illustrated in Figs. 7, 8 and 9. In this embodiment a capacitor section 32 is again composed of mica sheets 34 that are each individually gaged for thickness and given a voltage test before incorporation into the section 32. In this instance there are metal foil layers 33 which are interleaved between the sheets of mica 34 to form the plates of the finished capacitor as before. In this instance, however, the foil layers 33 are much shorter in lateral dimension, that is, they extend beyond the edge of the stack of mica sheets 34 only a short distance as compared with the embodiment shown in Figs. 3 and 4. In this case, the electrical contact with the leads is made in a different manner from that of the above other embodiments. Here a pair of lead wires 35 are merely brought alongside the capacitor section 32 as shown in Fig. 9, so that the ends of foils 33 are, or will be pressed into contact with the lead wires 35 themselves so as to form electrodes therewith. In this construction a piece of adhesive tape or the like 37 may be wrapped around the capacitor section 32 with the lead wires 35 in place (after the acrylic resin coating has been applied and set) so as to support the lead wires 35 until the capacitor section 32 with its leads 35 has been set into its premolded casing to form a finished capacitor as illustrated in Fig. 1. Temporary clamping fixtures 38 (as shown in dotted lines) may also be employed during the construction to help support the leads 35 in place.

It will be observed that the showings made in Figs. 8 and 9 are not to scale. Similarly the showings of Figs. 4, 6 and 7 have the vertical dimensions greatly exaggerated for descriptive purposes, since the actual layers of mica and foil are very thin.

While a capacitor section may be constructed using only metalized mica sheets and no foil as illustrated in Fig. 6, it is preferred to employ foil layers whether or not the mica sheets are metalized. The reason for this is that the foil layers are soft enough to be squeezed into any irregularities in the surfaces of the mica sheets when the predetermined pressure is applied as the section is formed. Therefore, no local stresses or strains are set up in the mica sheets, which might cause cracks or other defects resulting in leakage and shortened life of the finished capacitor.

It will be noted that the outside metal foil layers 33 (Fig. 7) i.e. the top and bottom foils, are both extended out the same side of the stack to be connected to the same electrode. This improves the electrical screening of the capacitor section so that if this electrode is grounded, the capacitor will be screened from outside influences.

The construction of a capacitor section according to the embodiment of Figs. 7, 8 and 9 may be carried out using the following steps to produce a capacitor section having superior accuracy and long life characteristics. First the layers of foil 33, and the previously gaged and tested sheets of mica 34, are stacked using a predetermined number of layers of a given size to give a capacitor having a certain magnitude of capacity. Then the stack is heated to a predetermined temperature in any suitable manner as by placing in an oven. The foils 33 are preferably made of a soft pliable material such as tinfoil containing a substantial amount of lead. Next, the stack is placed in a vacuum chamber and all the air will be exhausted while the stack is still in a heated condition. Then the stack is subjected to pressure sufficient to press the foils 33 into intimate contact with the mica sheets 34, but not so much as to extrude the metal of the foils 33 from the edges of the mica sheets 34. If necessary, the compressed stack may be heated again to maintain the temperature. It may again be subject to an evacuation chamber to evacuate the air while the stack is under compression, as by means of a clamp or the like. It is noted that the pressure on the stack need not be very great to obtain most intimate contact between the foils 33 and the mica sheets 34, because of the elevated temperature and the evacuation while hot. Finally the stack may be dipped or otherwise coated with a suitable insulating compound while still under compression. This forms a compact capacitor section with all foreign matter (in the form of dust or otherwise) excluded, and without any of the outer coating thereon (of insulating material) located in between the plates to cause any undesirable characteristics. After the section 32 has been thus formed the lead wires 35 may be attached as described above, and the whole unit will be ready to be encased in a premolded cover as more fully described below.

Of course the above described method of forming a capacitor section may be employed to form a section like that previously described and illustrated in Fig. 4 equally as well. Also, vice versa, the method described in connection with forming a capacitor section as illustrated in Fig. 4 may be employed to make a section like that illustrated in Fig. 7.

By using a preformed casing having the desired thickness of wall the overall dimensions of, and use of unnecessary material in the casing, may be cut down to a minimum. Formerly double the desired thickness of bakelite was used in an effort to be sure there was a sufficient coating of "bakelite" outside the capacitor section. Even then, sometimes, the capacitor section would be molded so near one side of the casing that a short circuit to one side of the capacitor could be had if the casing were pressed against a metal plate. Or sometimes the capacitor section would break right out of the casing during handling.

As an example of the increased capacity for a given case size, it was found that when using the prior type molded capacitor case measuring externally 51/64 inch x 51/64 inch x 1/4 inch, the walls will take 1/8 inch minimum, leaving only 1/8 inch for the capacitor stack. With the identical case dimension, a preformed case has walls totaling only 1/16 inch, leaving 3/16 inch for the capacitor stack or 50% additional space.

An additional advantage of the preformed or premolded case is the fact that the case is highly non-porous. Also, it is a fact that it is stronger for a given thickness, than the prior type molded capacitor case. These features result from the contact of the "bakelite" material with the smooth and hot surfaces of a steel die against both the inner and outer walls of the premolded case in the course of its formation. As a consequence the "bakelite" is smooth and dense on its inner walls as well as its outer walls. Furthermore, another factor that contributes to the superior moisture resistant quality of the finished capacitor is the good bond that exists between the metal of the leads and the epoxy resin into which the capacitor section is set.

The last step in the assembly of a finished capacitor according to this invention consists in the filling of the casing 11, after the capacitor section 13 has been placed therein, with an epoxy resin or other suitable material. A metered amount of the liquid resin will be introduced into the casing 11, and the capacitor section 13 with clamps 23 and lead wires 15 in place thereon, may then be immersed into the liquid in the casing 11 causing the liquid to flow around the section 13 and its leads 15 until the casing 11 is filled to the top. After this the whole capacitor will be heated and cured in the usual manner to set and cure the epoxy resin or other material. It will be observed that the liquid resin might be introduced around the capacitor section 13 after the section is in place in the casing 11, but this is not as satisfactory since the liquid resin may be slow to flow completely around and under the section 13. Whereas, if the section 13 with its leads 15 in place is immersed in a predetermined amount of the liqiud, the flow may take place while the heat is being first applied and will be complete before the resin has set. This produces a moisture-proof seal and holds the section firmly in place in the casing 11 without having applied any pressure sufficient to cause any physical damage or even any stresses or strains on the capacitor section 13, that might be aggravated in use.

By using the steps and apparatus of this invention, a mica capacitor that has a hard plastic casing such as "Bakelite" or the like for desirable heat resistant and good handling qualities, may be had. While, by using the methods of producing such a capacitor it is possible to gain a very high degree of reliability in the permanence of predetermined electrical characteristics. Such reliability and permanence is possible by reason of the steps and apparatus employed which eliminate any undue or excessive pressures upon the capacitor section during its formation or thereafter, and consequently eliminate the stresses and strains which have heretofore caused physical damage to such a capacitor section which tended to result in short life and unreliability in the finished product.

The curves and graphs of Figures 10, 11, 12 and 13 are self-explanatory and illustrate the highly improved results that are obtained from encapsulated capacitors according to this invention as compared to conventional molded capacitors according to prior conventional manufacture. It will be noted that the voltages employed in testing capacitors to obtain the curves and graphs shown in Figs. 11 and 12 are higher than those required by ordinary acceptance standards and consequently the results are more striking in demonstrating the excellence of the capacitors according to this invention.

Particular attention is drawn to the curves illustrated in Fig. 11 which show the results of comparative life tests employing capacitors according to this invention and comparable capacitors as constructed heretofore. It is pointed out that the life test subjects the capacitors being tested to a temperature of 85° C. and a voltage of 1000 volts D.C. Capacitors tested had a rated capacity of .005 microfarad and 500 working volts D.C. This same rating was true of the capacitors according to this invention and those prior types representing the conventional unit as manufactured heretofore. Curve 39, i.e. the solid curve, shows the percentage of capacitors according to this invention that survived this life test over an elapsed time period measured in hours running from 0 to 4000 hours. It is to be noted that this curve remains very nearly horizontal and the percentage survival gradually falls only to approximately 97 or 98%, showing the very excellent performance of capacitors as made according to this invention. On the other hand, a curve 41, i.e. the dotted line curve, illustrates the percentage survival among conventional capacitors as constructed heretofore. It will be observed that the percentage survival plunges steeply, ending with only about 18% after 4000 hours.

While there have been disclosed specific embodiments of this invention, they are not to be taken as in any way limiting this invention but should be considered merely as descriptive thereof.

It is claimed:

1. An improved construction for relatively small mica capacitors comprising a stacked capacitor section having alternate layers of metal foil and mica disposed in predetermined compressed relationship, said metal foil layers extending a relatively short distance beyond the mica on two sides for forming electrodes, a bonding material for holding the layers of said section together in said predetermined compressed relationship, straight lead wires having one end of each juxtaposed with said extending foil ends in order to make electrical contact therewith forming electrodes for the capacitor, supporting means surrounding said juxtaposed ends of said lead wires and said precompressed capacitor section for holding the lead wires in place relative to said electrodes, an open ended preformed unitary thermosetting phenolic resin casing sized to contain said precompressed capacitor section and terminal leads attached thereto and an epoxy resin filling the space within said casing and surrounding the contained capacitor section and adjacent terminal leads in hermetic non-compressive relationship to form a superior moisture-proof capacitor encased in thermosetting phenolic resin that has superior accuracy and long life.

2. An improved construction for relatively small mica capacitors comprising a stacked capacitor section having alternate layers of conducting metal foil material and mica disposed in predetermined compressed relationship, said conducting material layers extending beyond the mica on two sides thereof to form electrodes, a bonding material for holding the layers of said section together in said predetermined compressed relationship, terminal clamps having extending lead wires disposed in compressive engagement with said extending conducting material layers for making electrical contact therewith, an open ended preformed unitary thermo-setting phenolic resin casing sized to contain said clamped precompressed capacitor section with the terminal leads extending from the open end thereof and an epoxy resin filling the space within said casing and surrounding the contained capacitor section and terminal lead wires in hermetic non-compressive relationship to form a superior moisture-proof capacitor encased in thermo-phenolic resin having superior accuracy and increased operating life.

3. The improved capacitor construction as set forth in claim 2 wherein said bonding material is an acrylic resin.

4. The improved capacitor construction as set forth in claim 2 wherein the walls of said unitary preformed casing are of substantially uniform thickness.

5. The improved capacitor construction as set forth in claim 2 wherein said terminal clamps are integral with said lead wires and constitute deformed end portions thereof disposed in compressive engagement with said electrodes.

References Cited in the file of this patent

UNITED STATES PATENTS

| | | |
|---|---|---|
| 2,119,744 | Heyman | June 7, 1938 |
| 2,143,369 | Dubilier | Jan. 10, 1939 |
| 2,166,205 | Anderson | July 18, 1939 |
| 2,177,266 | Schupp et al. | Oct. 24, 1939 |
| 2,390,784 | Drobish | Dec. 11, 1945 |
| 2,522,713 | Gray | Sept. 19, 1950 |
| 2,674,646 | Schoch | Apr. 6, 1954 |
| 2,704,880 | Brennan | Mar. 29, 1955 |

FOREIGN PATENTS

| | | |
|---|---|---|
| 504,926 | Great Britain | Apr. 27, 1939 |
| 596,979 | Great Britain | Jan. 15, 1948 |
| 619,193 | Great Britain | Mar. 4, 1949 |
| 692,982 | Great Britain | June 17, 1953 |